(12) United States Patent
Wu et al.

(10) Patent No.: US 11,830,107 B2
(45) Date of Patent: Nov. 28, 2023

(54) METHOD AND APPARATUS FOR FILTERING IMAGE COLORS, ELECTRONIC DEVICE AND STORAGE MEDIUM

(71) Applicant: BOE Technology Group Co., Ltd., Beijing (CN)

(72) Inventors: Yanhong Wu, Beijing (CN); Lijie Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 111 days.

(21) Appl. No.: 17/434,381

(22) PCT Filed: Feb. 9, 2021

(86) PCT No.: PCT/CN2021/076273
§ 371 (c)(1),
(2) Date: Aug. 26, 2021

(87) PCT Pub. No.: WO2021/212977
PCT Pub. Date: Oct. 28, 2021

(65) Prior Publication Data
US 2023/0147596 A1    May 11, 2023

(30) Foreign Application Priority Data
Apr. 24, 2020   (CN) .......................... 202010330645.7

(51) Int. Cl.
*G06T 11/00*   (2006.01)
*G06T 7/90*    (2017.01)
(Continued)

(52) U.S. Cl.
CPC .............. *G06T 11/001* (2013.01); *G06T 5/20* (2013.01); *G06T 7/90* (2017.01); *G06T 2207/10024* (2013.01); *G06T 2210/62* (2013.01)

(58) Field of Classification Search
CPC . G06T 11/001; G06T 7/90; G06T 5/20; G06T 2207/10024; G09G 5/02;
(Continued)

(56) References Cited

U.S. PATENT DOCUMENTS

2003/0001860 A1*  1/2003  Yamazaki ............ H04N 1/6058
                                                        345/590
2015/0055858 A1   2/2015  Abdallah et al.

FOREIGN PATENT DOCUMENTS

CN    102117413 A    7/2011
CN    104463105 A    3/2015
(Continued)

*Primary Examiner* — Wesner Sajous
(74) *Attorney, Agent, or Firm* — IPro, PLLC (57) ABSTRACT

Embodiments of the present disclosure provide a method and apparatus for filtering image colors, an electronic device and a storage medium. The method includes: acquiring an image to be filtered, wherein a pixel point in the image to be filtered is represented by a hue value, a saturation value and a value; acquiring a retaining proportion of the pixel point in the image to be filtered, wherein a retaining proportion of any pixel point is used to indicate a degree of a saturation of the pixel point to be retained, and is positively correlated with a similarity between a hue of the pixel point and a hue to be retained of the pixel point; and acquiring a filtered image by adjusting the saturation value of the pixel point in the image to be filtered based on the retaining proportion of the pixel point in the image to be filtered.

20 Claims, 8 Drawing Sheets

(51) Int. Cl.
  *G06T 5/20* (2006.01)
  *G09G 5/02* (2006.01)
  *G09G 5/30* (2006.01)
  *H04N 5/57* (2006.01)
  *H04N 9/64* (2023.01)
  *H04N 9/78* (2006.01)

(58) Field of Classification Search
  CPC ...... G09G 1/28; G09G 3/2003; G09G 3/3607; G09G 5/026; G09G 5/30; G09G 5/391; G09G 2320/02; G09G 2320/0233; G09G 2320/0242; G09G 2320/0271; G09G 2320/0276; G09G 2320/029; G09G 2320/0295; G09G 2320/04; G09G 2320/06; G09G 2320/0626; G09G 2320/066; G09G 2320/0666; G09G 2320/0673; G09G 2320/068; G09G 2320/0686; G09G 2340/0457; G09G 2340/06; H04N 1/58; H04N 1/60; H04N 1/6027; H04N 1/6041; H04N 1/6038; H04N 1/6075; H04N 1/6077; H04N 5/57; H04N 5/58; H05N 9/44; H05N 9/455; H05N 9/64; H05N 9/69; H05N 9/70; H05N 9/73; H05N 9/74; H05N 9/77; H05N 9/78; H05N 13/15
  USPC ....................................................... 345/592
  See application file for complete search history.

(56) References Cited

FOREIGN PATENT DOCUMENTS

| CN | 106454300 B | * | 9/2016 |
| CN | 108474886 A | * | 10/2016 |
| CN | 106558060 A | | 4/2017 |
| CN | 110503115 A | | 11/2019 |
| JP | WO2018061615 A1 | * | 9/2017 |

* cited by examiner

| Acquiring a filtering instruction transmitted for the image to be filtered, wherein the filtering instruction carries a hue parameter and a range parameter, the hue parameter indicates a hue to be retained of the image to be filtered, and the range parameter indicates a transition range from the hue to be retained to a hue to be filtered out | — 3021 |

| Acquiring a transparency proportion of the image to be filtered, wherein the transparency proportion indicates a transparency of the image to be filtered in a filtered image | — 3023 |

| Acquiring the retaining proportion of the pixel point in the image to be filtered based on the transparency proportion, the hue parameter and the range parameter | — 3022 |

METHOD AND APPARATUS FOR FILTERING IMAGE COLORS, ELECTRONIC DEVICE AND STORAGE MEDIUM

CROSS REFERENCE TO RELATED APPLICATION

This application is a 371 of PCT Patent Application Serial No. PCT/CN2021/076273, filed on Feb. 9, 2021, which claims priority to Chinese Patent Application No. 202010330645.7, filed on Apr. 24, 2020 and entitled "METHOD AND APPARATUS FOR FILTERING IMAGE COLORS, ELECTRONIC DEVICE AND STORAGE MEDIUM", the entire contents of both of which are herein incorporated by reference.

TECHNICAL FIELD

The present disclosure relates to a method and apparatus for filtering image colors, an electronic device and a storage medium.

BACKGROUND

Color filtering is a classical issue in the field of image processing. A function of color filtering can be used to generate artistic images, extract seals and invoice numbers in instruments and the like. Color filtering means maintaining a designated color in a given image unchanged while turning other colors in the given image into grey.

SUMMARY

The present disclosure provides a method and apparatus for filtering image colors, an electronic device and a storage medium. The technical solutions are as follows.

According to an aspect, there is provided a method for filtering image colors. The method includes:

acquiring an image to be filtered, wherein a pixel point in the image to be filtered is represented by a hue value, a saturation value and a value;

acquiring a retaining proportion of the pixel point in the image to be filtered, wherein a retaining proportion of any pixel point is used to indicate a degree of a saturation of the pixel point to be retained, and is positively correlated with a similarity between a hue of the pixel point and a hue to be retained of the pixel point; and acquiring a filtered image by adjusting the saturation value of the pixel point in the image to be filtered based on the retaining proportion of the pixel point in the image to be filtered.

Optionally, acquiring the retaining proportion of the pixel point in the image to be filtered includes:

acquiring a filtering instruction transmitted for the image to be filtered, wherein the filtering instruction carries a hue parameter and a range parameter, the hue parameter indicates a hue to be retained of the image to be filtered, and the range parameter indicates a transition range from the hue to be retained to a hue to be filtered out; and acquiring the retaining proportion of the pixel point in the image to be filtered based on the filtering instruction.

Optionally, acquiring the retaining proportion of the pixel point in the image to be filtered based on the filtering instruction includes:

acquiring a mapping relationship between a hue, determined by the hue parameter and the range parameter, and the retaining proportion; and acquiring the retaining proportion of the pixel point in the image to be filtered based on the mapping relationship and the hue value of the pixel point in the image to be filtered.

Optionally, a mapping relationship between the hue x, determined by the hue parameter H0 and the range parameter a, and a reference retaining proportion f(x) satisfies the following equation:

$$f(x) = e^{-\frac{(x-H0)^2}{2 \times \sigma^2}}.$$

Optionally, acquiring the retaining proportion of the pixel point in the image to be filtered further includes:

acquiring a transparency proportion of the image to be filtered, wherein the transparency proportion indicates a transparency of the image to be filtered in a filtered image; and acquiring the retaining proportion of the pixel point in the image to be filtered based on the filtering instruction includes:

acquiring a reference retaining proportion of the pixel point in the image to be filtered based on the hue parameter and the range parameter; and acquiring the retaining proportion of the pixel point in the image to be filtered based on the reference retaining proportion and the transparency proportion.

Optionally, acquiring the retaining proportion of the pixel point in the image to be filtered based on the reference retaining proportion and the transparency proportion includes:

acquiring an opacity proportion of the image to be filtered based on the transparency proportion, wherein the opacity proportion indicates an opacity displayed by the image to be filtered in the filtered image; and determining a larger one of a reference retaining proportion and an opacity proportion of the pixel point as the retaining proportion of the pixel point.

Optionally, acquiring the filtered image by adjusting the saturation value of the pixel point in the image to be filtered based on the retaining proportion of the pixel point in the image to be filtered includes:

determining a product of the retaining proportion of the pixel point and a saturation value of the pixel point as an adjusted saturation value of the pixel point.

Optionally, acquiring the image to be filtered includes:

when an image needed to be filtered is represented by a color space other than an HSV color space, acquiring the image to be filtered by converting the image needed to be filtered into an image represented by the HSV color space; and when the image needed to be filtered is represented by the HSV color space, determining the image needed to be filtered as the image to be filtered.

Optionally, after acquiring the filtered image by adjusting the saturation value of the pixel point in the image to be filtered based on the retaining proportion of the pixel point in the image to be filtered, the method further includes:

converting the filtered image into an image represented by a red-green-blue RGB color space; and displaying a converted image represented by the RGB color space.

According to another aspect of the present disclosure, there is provided an apparatus for filtering image colors. The apparatus includes:

an acquiring module configured to acquire an image to be filtered, wherein a pixel point in the image to be filtered is represented by a hue value, a saturation value and a value, wherein the acquiring module is further configured to acquire a retaining proportion of the pixel point in the image to be filtered, wherein a retaining proportion of any pixel point is used to indicate a degree of a saturation of the pixel point to be retained, and is positively correlated with a similarity between a hue of the pixel point and a hue to be retained of the pixel point; and a processing module configured to acquire a filtered image by adjusting the saturation value of the pixel point in the image to be filtered based on the retaining proportion of the pixel point in the image to be filtered.

Optionally, the acquiring module is further configured to:

acquire a filtering instruction transmitted for the image to be filtered, wherein the filtering instruction carries a hue parameter and a range parameter, the hue parameter indicates a hue to be retained of the image to be filtered, and the range parameter indicates a transition range from the hue to be retained to a hue to be filtered out; and acquire the retaining proportion of the pixel point in the image to be filtered based on the filtering instruction.

Optionally, the acquiring module is further configured to:

acquire a mapping relationship between a hue, determined by the hue parameter and the range parameter, and the retaining proportion; and acquire the retaining proportion of the pixel point in the image to be filtered based on the mapping relationship and the hue value of the pixel point in the image to be filtered.

Optionally, a mapping relationship between the hue x, determined by the hue parameter H0 and the range parameter σ, and a reference retaining proportion f(x) satisfies the following equation:

$$f(x) = e^{-\frac{(x-H0)^2}{2 \times \sigma^2}}.$$

Optionally, the acquiring module is further configured to:

acquire a transparency proportion of the image to be filtered, wherein the transparency proportion indicates a transparency of the image to be filtered in a filtered image; and acquiring the retaining proportion of the pixel point in the image to be filtered based on the filtering instruction includes:

acquiring a reference retaining proportion of the pixel point in the image to be filtered based on the hue parameter and the range parameter; and acquiring the retaining proportion of the pixel point in the image to be filtered based on the reference retaining proportion and the transparency proportion.

Optionally, the acquiring module is further configured to:

acquire an opacity proportion of the image to be filtered based on the transparency proportion, wherein the opacity proportion indicates an opacity displayed by the image to be filtered in the filtered image; and determine a larger one of a reference retaining proportion and an opacity proportion of the pixel point as the retaining proportion of the pixel point.

Optionally, the processing module is further configured to:

determine a product of the retaining proportion of the pixel point and a saturation value of the pixel point as an adjusted saturation value of the pixel point.

Optionally, the acquiring module is further configured to:

when an image needed to be filtered is represented by a color space other than an HSV color space, acquire the image to be filtered by converting the image needed to be filtered into an image represented by the HSV color space; and when the image needed to be filtered is represented by the HSV color space, determine the image needed to be filtered as the image to be filtered.

Optionally, the apparatus further includes:

a converting module configured to convert the filtered image into an image represented by a red-green-blue RGB color space; and a displaying module configured to display a converted image represented by the RGB color space.

According to yet another aspect of the present disclosure, an electronic device is provided. The electronic device includes: a memory, a processor and a computer program stored in the memory and executable on the processor, wherein when the program is executed by the processor, the method provided by the present disclosure can be realized.

According to yet another aspect of the present disclosure, a non-transitory computer-readable storage medium storing computer instructions therein is provided. The computer instructions are configured to enable a computer to perform the method provided by the present disclosure.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

To make objectives, technical solutions and advantages of the present disclosure clearer, the present disclosure will be further described in detail below in conjunction with specific embodiments and with reference to the accompanying drawings. Similar components in the drawings are denoted by the same reference numerals. Those skilled in the art should understand that the contents specifically described below are illustrative rather than restrictive, and should not be used to limit the scope of protection of the present disclosure.

It is to be noted that unless otherwise defined, technical terms or scientific terms used in the embodiments of the present disclosure shall be of ordinary meaning as understood by those of ordinary skill in the art to which the present disclosure pertains. The term "first" or "second" or a similar term used in the embodiments of the present disclosure does not denote any order, quantity, or importance, but is merely used to distinguish different components. The term "comprise" or "include", or the like is intended to mean that elements or items which appear before the term include the elements or items listed after the term and their equivalents, and do not exclude other elements or items. The term "connection" or "connected to" or a similar term is not limited to a physical or mechanical connection but may include an electrical connection that is direct or indirect.

Figure 1:
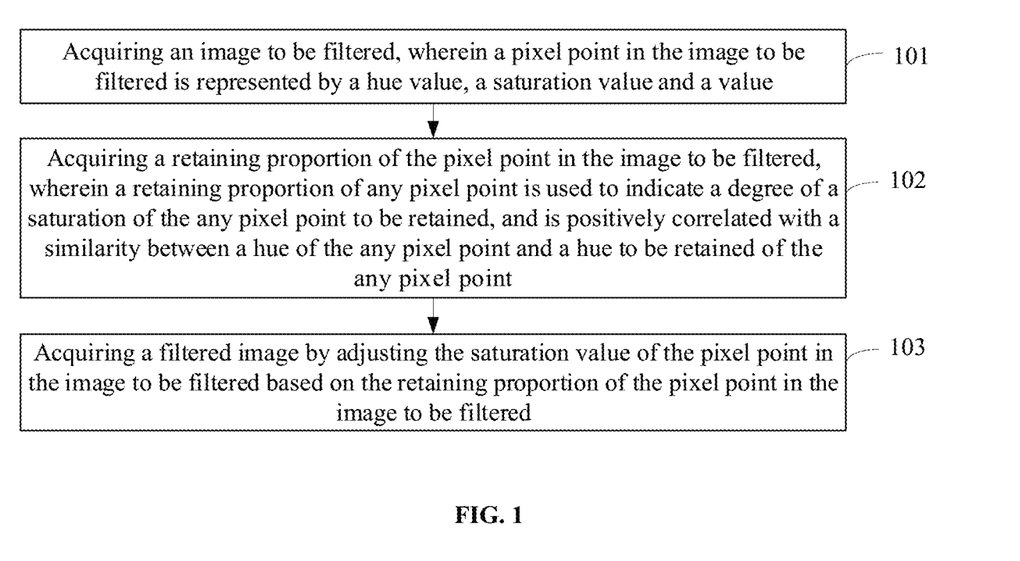
FIG. 1 is a schematic flowchart of a method for filtering image colors according to an embodiment of the present disclosure.

FIG. 1 is a schematic flowchart of a method for filtering image colors according to an embodiment of the present disclosure. As shown in FIG. 1, the method for filtering the image colors includes the following steps.

In step 101, an image to be filtered is acquired, wherein a pixel point in the image to be filtered is represented by a hue value, a saturation value and a value.

Figure 2:
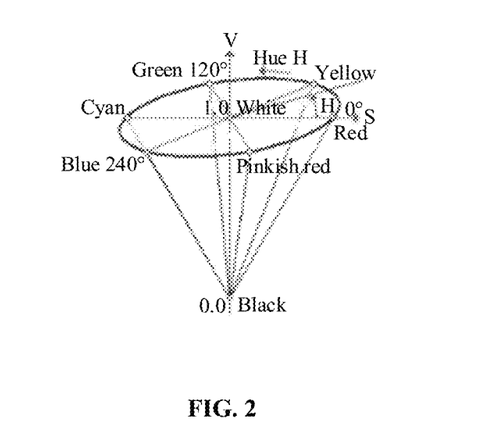
FIG. 2 is a structural diagram of an HSV color space according to an embodiment of the present disclosure.

That is, the image to be filtered is an image represented by an HSV color space. HSV is a relatively intuitive color model, and color parameters in this model are hue (H), saturation (S) and value (V). FIG. 2 is a schematic diagram of the HSV color space that is in a cone shape, and FIG. 2 shows relationships between hue, saturation and value and colors represented by the three. Hue, saturation and value usually have different values in different scenarios, and for different colors, are intended to indicate different values of hue, saturation and value of the corresponding colors.

The hue H represents color information, i.e., positions of spectral colors, and this parameter is measured by angle. As shown in FIG. 2, the value of H ranges from 0° to 360°. Calculated counterclockwise from red, red is 0°, green is 120°, and blue is 240°, and their complementary colors are 60° for yellow, 180° for cyan, and 300° for pinkish red.

The saturation S indicates a similarity between a color and a spectral color, and can also be understood as a ratio of the purity of a selected color and the maximum purity of the color. A color can be seen as a result of mixing a certain spectral color with white. The greater a proportion of the spectral color is, the more similar the color is to the spectral color, and the higher the saturation of the color is. The color is dark and bright if the saturation is high. The saturation is maximum if the spectral color contains 0 white light. The saturation S is a proportional value. As shown in FIG. 2, the saturation value usually ranges from 0 to 1 (or 0% to 100%). The greater the saturation value is, the more saturated the color is. When S=0, there is only grey scale in the color.

The value V represents the brightness of the color. As shown in FIG. 2, the value ranges from 0 (black) to 1 (white). For a light source color, the value is relevant to the luminance of a luminant. For an object color, this value is relevant to the transmittance or the reflectance of an object. There is no direct relationship between value and the light intensity.

When OpenCV (development software) is used for images with 3 channels represented by 8-bit binary bits, the value of H is 0-179, the value of S is 0-255 and the value of V is 0-255, which are taken as an example by the embodiment of the present disclosure for illustration.

In step 102, a retaining proportion of the pixel point in the image to be filtered is acquired, wherein a retaining proportion of any pixel point is used to indicate a degree of a saturation of the pixel point to be retained, and is positively correlated with a similarity between a hue of the pixel point and a hue to be retained of the pixel point.

In step 103, a filtered image is acquired by adjusting the saturation value of the pixel point in the image to be filtered based on the retaining proportion of the pixel point in the image to be filtered.

In the method for filtering the image colors, provided by the embodiment of the present disclosure, the retaining proportion of the pixel point in the image to be filtered is acquired, and the saturation value of the pixel point in the image to be filtered is adjusted based on the retaining proportion. Since the retaining proportion of any pixel point is positively correlated with the similarity between the hue of the pixel point and the hue to be retained of the pixel point, the more similar the color is to the hue to be retained in the filtered image, the higher a saturation of the color is, and the more different the color is from the hue to be retained, the lower the saturation of the color is. That is, when the color is more similar to grey, some colors may be accurately kept unchanged without damaging a visual effect, and at the same time, other colors are changed into grey, making a color filtering effect transition naturally and achieving a better filtering effect.

Figure 3:
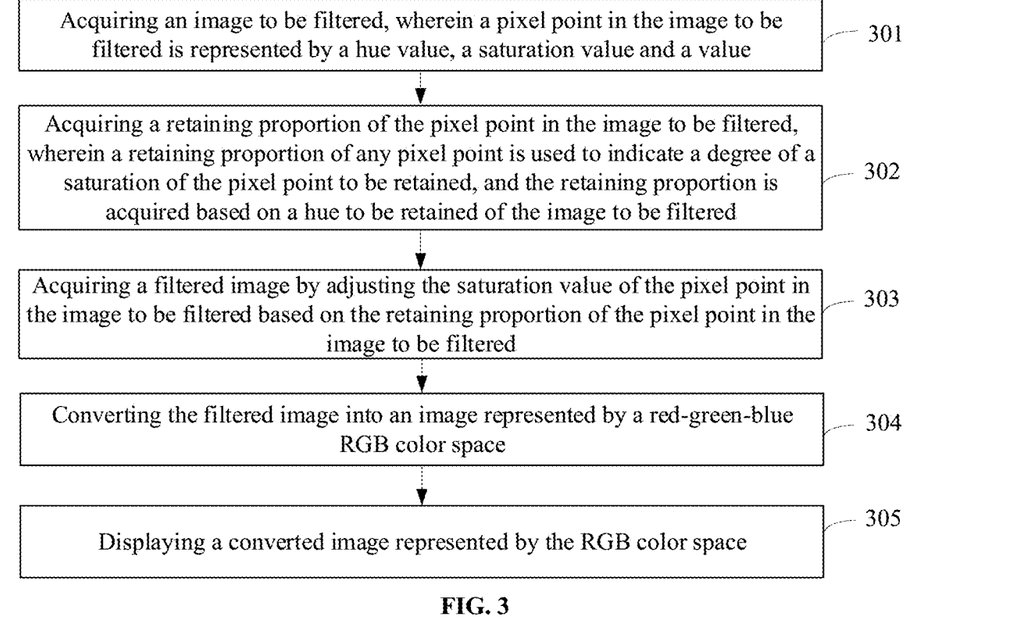
FIG. 3 is a schematic flowchart of another method for filtering image colors according to an embodiment of the present disclosure.

FIG. 3 is a schematic flowchart of another method for filtering image colors according to an embodiment of the present disclosure. As shown in FIG. 3, the method for filtering the image colors includes the following steps.

In step 301, an image to be filtered is acquired, wherein a pixel point in the image to be filtered is represented by a hue value, a saturation value and a value.

The method for filtering the image colors, provided by the embodiment of the present disclosure, may be executed based on a user's instruction, and the user needs to indicate an image needed to be filtered and a color to be retained. In method for filtering the image colors, provided by the embodiment of the present disclosure, filtering is achieved by adjusting the saturation value of the image in the HSV color space, i.e., the image to be filtered is an image represented by HSV. When the user indicates the type of the image needed to be filtered, step 301 includes the following implementation modes.

In one implementation manner, when the image needed to be filtered indicated by the user is represented by the HSV color space, step 301 includes: determining the image needed to be filtered indicated by the user as the image to be filtered. That is, when the image needed to be filtered indicated by the user is an image represented by the HSV color space, the image needed to be filtered indicated by the user may be directly filtered.

In another implementation mode, when the image needed to be filtered indicated by the user is represented by a color space other than the HSV color space, step 301 includes: acquiring the image to be filtered by converting the image needed to be filtered indicated by the user into an image represented by the HSV color space. That is, when the image needed to be filtered indicated by the user is not the image represented by the HSV color space, it is necessary to first convert the image needed to be filtered indicated by the user into the image represented by the HSV color space.

Optionally, the image needed to be filtered indicated by the user may be converted into the image represented by the HSV color space based on a relationship between an expression mode of the pixel point in the image needed to be filtered indicated by the user and an expression mode of the pixel point in the image represented by the HSV color space.

In an example, when the image needed to be filtered indicated by the user is an image represented by a red (R) green (G) and blue (B) color space, i.e., each pixel point in the image needed to be filtered indicated by the user is co-represented by an R value, a G value and a B value, the relationship between the expression mode of the pixel point in the image represented by the RGB color space and the expression mode of the pixel point in the image represented by the HSV color space meets the following Formula 1. At this time, the image represented by the RGB color space may be converted into the image represented the HSV color space based on the following Formula 1:

$$R^* = \frac{R}{255}, G^* = \frac{G}{255}, B^* = \frac{B}{255} \quad \text{(Formula 1)}$$

$$C_{max} = \max(R^*, G^*, B^*), C_{min} = \min(R^*, G^*, B^*), \Delta = C_{max} - C_{min}$$

$$H = \begin{cases} 0° & , \Delta = 0 \\ 60° \times \left(\frac{G^* - B^*}{\Delta} + 0\right) & , C_{max} = R^* \\ 60° \times \left(\frac{B^* - R^*}{\Delta} + 2\right) & , C_{max} = G^* \\ 60° \times \left(\frac{R^* - G^*}{\Delta} + 4\right) & , C_{max} = B^* \end{cases}$$

$$S = \begin{cases} 0 & , C_{max} = 0 \\ \frac{\Delta}{C_{max}} & , C_{max} \neq 0 \end{cases}, V = C_{max},$$

in which R represents the R value of the pixel point in the image represented by the RGB color space, G represents the G value of the pixel point in the image represented by the RGB color space, B represents the B value of the pixel point in the image represented by the RGB color space, H represents the H value of the pixel point in the converted image represented by the HSV color space, S represents the S value of the pixel point in the converted image represented by the HSV color space, and V represents the V value of the pixel point in the converted image represented by the HSV color space.

Figure 4:
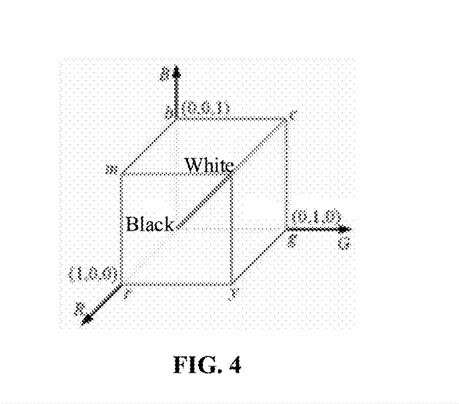
FIG. 4 is a schematic diagram of an RGB color space according to an embodiment of the present disclosure.

The RGB color space is designed under the principle of color light emission. FIG. 4 is a schematic diagram of the RGB color space, which is a cube. Generally speaking, the color mixing mode in the RGB color space is like the three lights of red, green and blue. When their light overlaps each other, the colors are mixed, but the luminance is equal to the sum of the luminance of two. The more mixed the colors are, the higher the luminance is, i.e., additive mixing is adopted. The RGB value refers to the luminance and is expressed by an integer. For example, each color of red, green and blue channels is divided into 256 orders of luminance, which is represented by numbers from 0, 1, 2 . . . to 255. The "light" is the weakest at the 0-order luminance, i.e., the "light" is turned off, while the "light" is the brightest at the 255-order luminance. When the grey values of all the three colors are the same, grey hues with different grey values are produced, i.e., when the grey values of all the three colors are all 0, they are of the darkest black hues. When the grey scales of all the three colors are 255, they are of the brightest white hues.

In step 302, a retaining proportion of the pixel point in the image to be filtered is acquired, wherein a retaining proportion of any pixel point is used to indicate a degree of a saturation of the pixel point to be retained, and the retaining proportion is acquired based on a hue to be retained of the image to be filtered.

Figure 5:
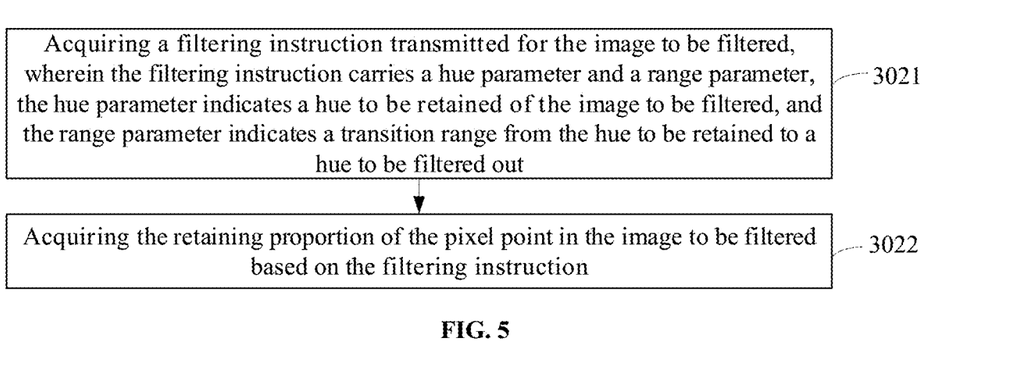
FIG. 5 is a schematic flowchart showing acquisition of a retaining proportion of a pixel point in an image to be filtered according to an embodiment of the present disclosure.

In some embodiments, as shown in FIG. 5, step 302 includes the following sub-steps.

In step 3021, a filtering instruction transmitted for the image to be filtered is acquired, wherein the filtering instruction carries a hue parameter and a range parameter, the hue parameter indicates a hue to be retained of the image to be filtered, and the range parameter indicates a transition range from the hue to be retained to a hue to be filtered out.

When instructing to filter the image, the user may also indicate the hue to be retained and the transition range. For example, a hue setting button and a range setting button are disposed on an interface of an image filtering application. The user may set the hue to be retained upon clicking the color setting button, and may also set the transition range within which the hue to be retained is adjusted to the hue to be filtered upon clicking the range setting button. The image filtering application may acquire the hue parameter and the range parameter upon receiving a user's setting operation. It should be noted that instructing to filter the image and sending a filtering instruction are not limited to being performed by the user, but for example, may also be automatically performed by an electronic device based on application requirements.

Optionally, the user's setting operation may be realized by the user inputting relevant parameters, or by the user performing a selection operation within an optional range provided by the image filtering application, which is not specifically limited in the embodiment of the present disclosure.

In step 3022, the retaining proportion of the pixel point in the image to be filtered is acquired based on the filtering instruction.

Optionally, step 3022 includes the following sub-steps.

In step 3022*a*1, a mapping relationship between a tune, determined by the hue parameter and the range parameter, and the retaining proportion is acquired.

In the embodiment of the present disclosure, each pixel point in the image to be filtered has a hue, and the retaining proportion of the pixel point may be determined based on the hue of the pixel point, so as to help adjust the saturation of the pixel point based on the retaining proportion of the pixel point during the filtering process. There is a mapping relationship between the hue of the pixel point and its retaining proportion, and the mapping relationship may be expressed by a functional expression. Moreover, when the hue indicated by the hue parameter and/or the range indicated by the hue parameter are different, the mapping relationship determined by the hue parameter and the range parameter has different expressions.

In some embodiments, the mapping relationship between the hue x determined by the hue parameter H0 and the range parameter a and a reference retaining proportion f(x) satisfies the following Formula 2:

$$f(x) = e^{-\frac{(x-H0)^2}{2 \times \sigma^2}}, \quad \text{(Formula 2)}$$

in which x is the hue value of the pixel point in the image to be filtered, f(x) is the retaining proportion of the pixel point, H0 is the hue value of the hue indicated by the hue parameter, and σ is the transition range indicated by the range parameter.

The expression of a Gauss function is as shown in Formula 3. It can be seen from the expression of the mapping relationship that the expression is a modification of the Gauss function $$f(x) = \frac{1}{\sigma \times \sqrt{2 \times \pi}} \times e^{-\frac{(x-H0)^2}{2 \times \sigma^2}}. \quad \text{(Formula 3)}$$

Figure 6:
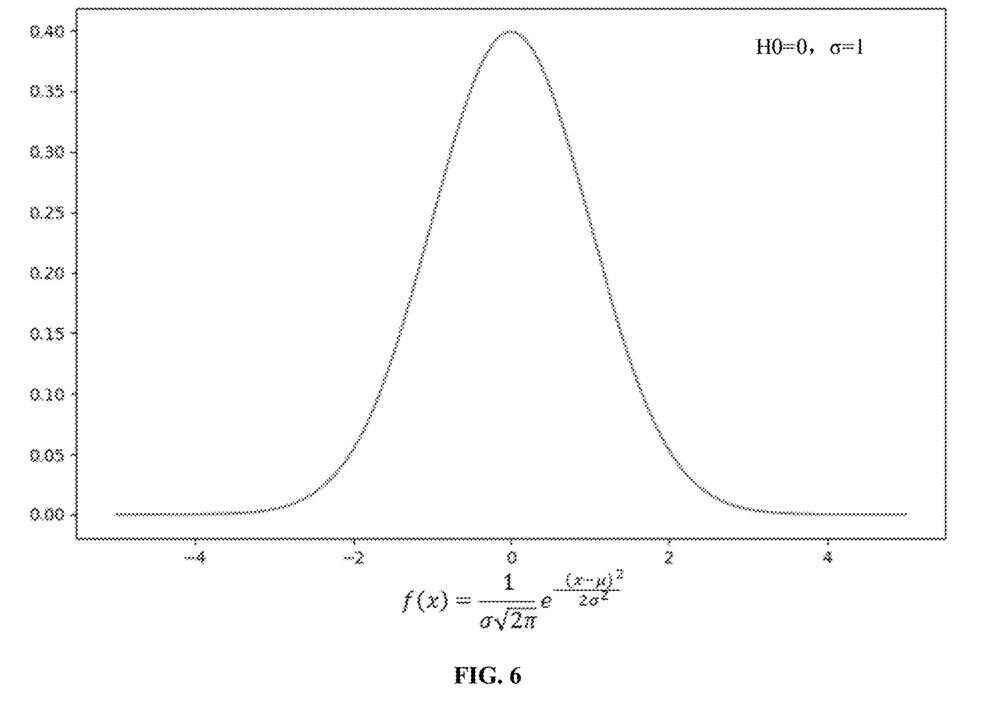
FIG. 6 is a schematic diagram showing a distribution pattern of a Gauss function according to an embodiment of the present disclosure.
Figure 7:
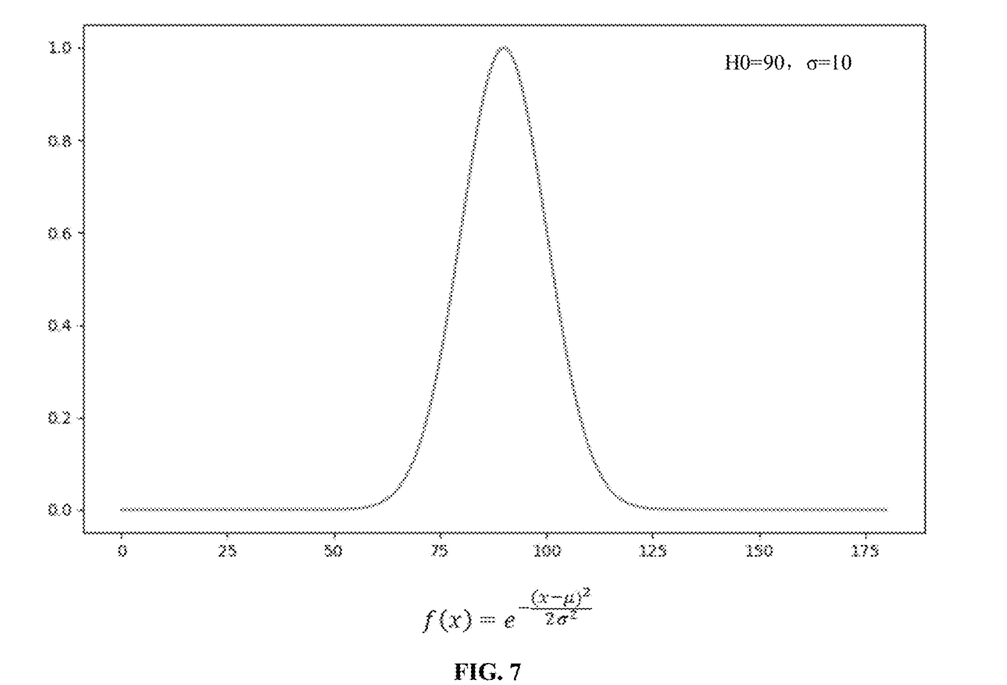
FIG. 7 is a schematic diagram showing a distribution pattern of another Gauss function according to an embodiment of the present disclosure.

The distribution diagram of the Gauss function is as shown in FIG. 6, and is shown in a shape high on both sides and low in the middle. In an embodiment of the present disclosure, a modified Gauss function is used, of which a distribution diagram is shown in FIG. 7, and in this distribution diagram, when x=H0, f(x) is equal to 1 and decreases with the increase of the distance between the value of x and the mean value H0. In this way, based on the characteristics of the modified Gauss function, the hue value H0 of the hue to be retained is taken as the mean value, and the transition range is taken as a variance, so that the retaining proportion of the pixel point is distributed high in the middle and low on two sides based on the difference of the hue values. Thus, when filtering is performed based on the retaining proportion, it can make the color filtering effect transition naturally and the color continuous.

Figure 8:
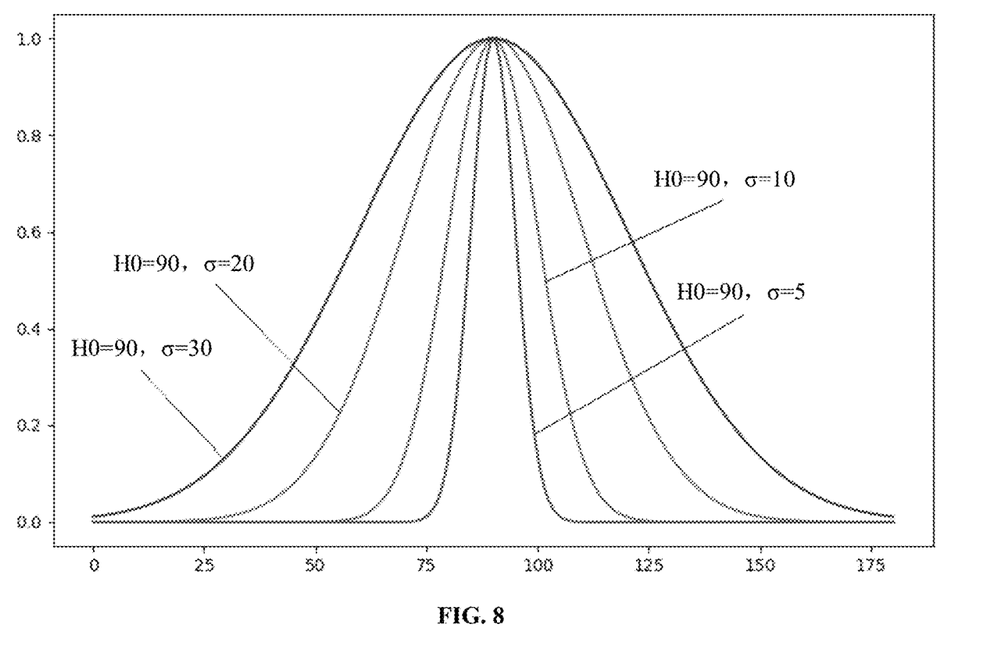
FIG. 8 is a schematic diagram showing distribution of different retaining proportions produced by different σ when H of a hue to be retained is H=90 according to an embodiment of the present disclosure.
Figure 9:
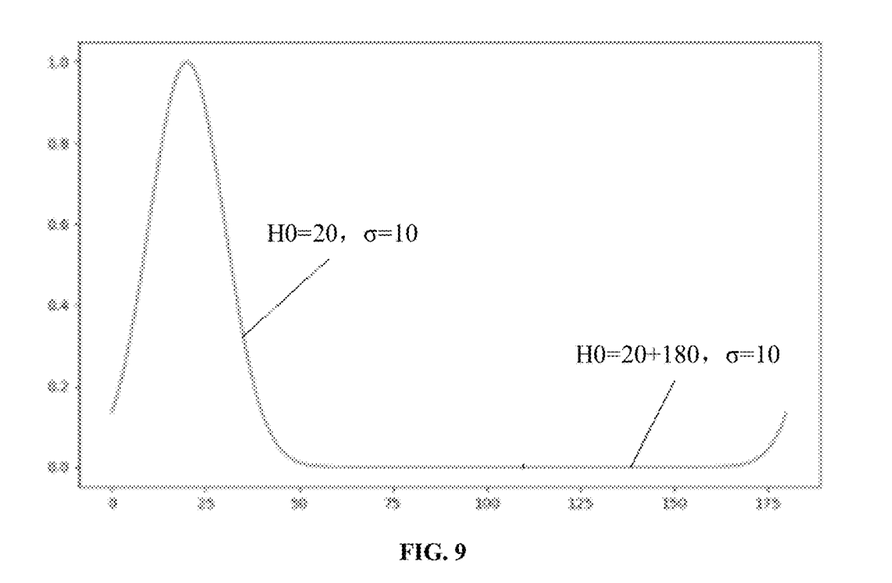
FIG. 9 is a schematic diagram showing distribution of retaining proportions when H is 20 and σ is 10 according to an embodiment of the present disclosure.
Figure 10:
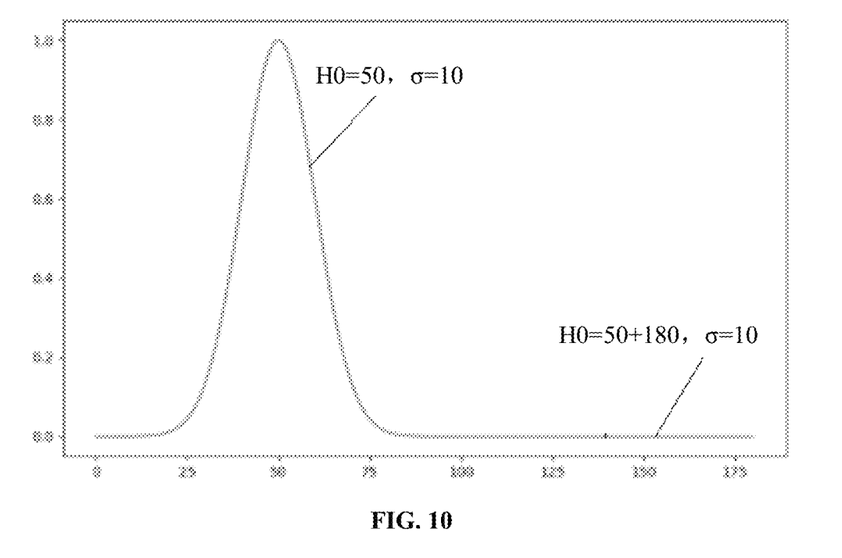
FIG. 10 is a schematic diagram showing distribution of retaining proportions when H is 50 and σ is 10 according to an embodiment of the present disclosure.
Figure 11:
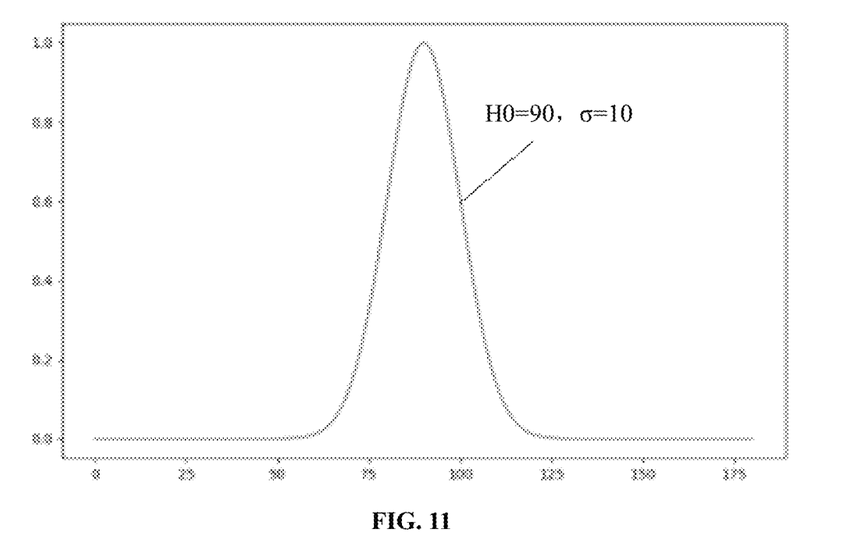
FIG. 11 is a schematic diagram showing distribution of retaining proportions when H is 90 and σ is 10 according to an embodiment of the present disclosure.
Figure 12:
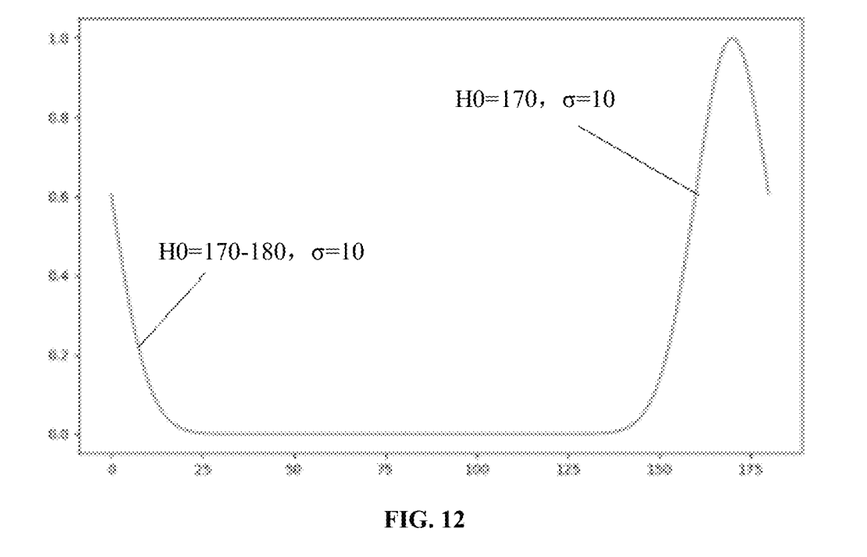
FIG. 12 is a schematic diagram showing distribution of retaining proportions when H is 170 and σ is 10 according to an embodiment of the present disclosure.

Moreover, FIG. 8 shows the distribution of different retaining proportions produced by different σ when the hue to be retained is H=90. As can be seen from FIG. 8, the smaller σ is, the narrower the transition range is, and the purer the retained color is. Therefore, in the embodiment of the present disclosure, the value of a may be set according to application requirements. For example, as shown in FIG. 2, there are several main hues in the HSV color space based on the value range of the hue, and a distance between the colors is defined as the difference of the hue values. For example, when the distance between red and yellow is 30, in order to distinguish different colors in the filtering process, it is necessary to guarantee that the mapping relationship can distinguish the difference between the different hues. Moreover, based on the 2sigma principle of the Gauss function, it can be known that when 2σ=30 or 3σ=30, the retaining proportion may be gradually reduced to 0 within the distance 30 around the hue value H0, so that different colors may be distinguished, and the visual effect of the main hues can be guaranteed without doping with other hues. Therefore, the value range of a may be set to 10-15, so that the color filtering effect achieved in this way may transition naturally and the colors may be continuous. At this time, if the method for filtering the image colors, provided by the embodiment of the present disclosure, is applied to an artistic style filter, the effect of the artistic style filter may be effectively guaranteed and the user experience may be improved.

In addition, it is known from FIG. 2 that the hue value is within a periodically cyclic range. In OpenCV, the range of the hue value is [0,179] and the period is 180. Therefore, as the hue to be retained changes, the distribution diagram of the mapping relationship will change accordingly, and its results are shown in FIG. 9 to FIG. 12. As can be seen from FIGS. 9 to 12, when H0 is different, the change trend of the distribution diagram will not change, but the peak of the distribution diagram changes with H0.

In step 3022a2, the retaining proportion of the pixel point in the image to be filtered is acquired based on the mapping relationship and the hue value of the pixel point in the image to be filtered.

After acquiring the mapping relationship between the hue and the retaining proportion, the retaining proportion of each pixel point may be determined based on the hue value of the pixel point in the image and the mapping relationship. For example, for any pixel point in the image to be filtered, the value of x in Formula 1 may be set to the hue value of the pixel point, and then the value of f(x) in Formula 1 may be acquired and determined as the retaining proportion of the pixel point.

Optionally, a retaining proportion table may be used to record the retaining proportion of each pixel point in the image to be filtered, so that in the filtering process, the retaining proportion table may be looked up based on the hue value of each pixel point.

Figure 13:
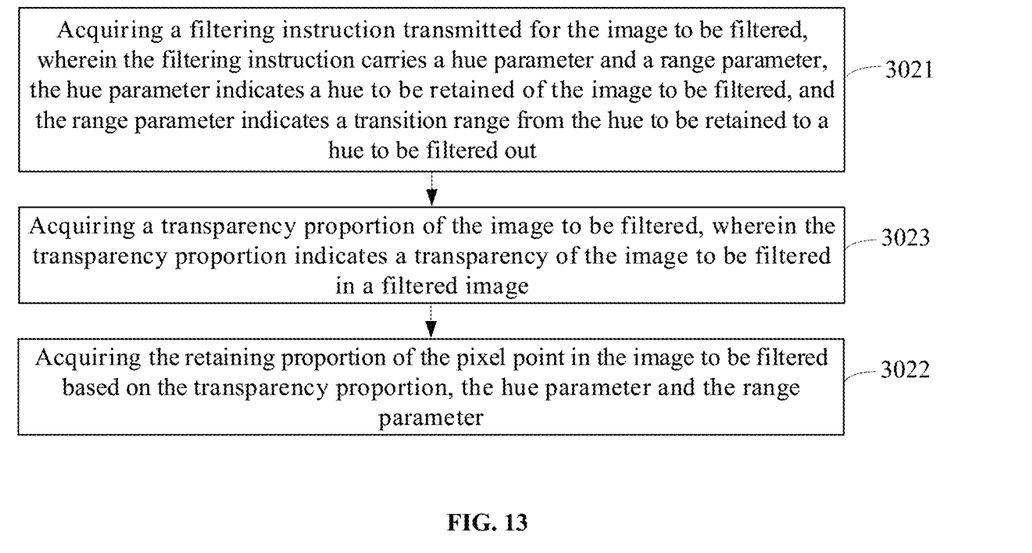
FIG. 13 is another schematic flowchart showing acquisition of a retaining proportion of a pixel point in an image to be filtered according to an embodiment of the present disclosure.

It should be noted that the user may also indicate the degree of influence of the image to be filtered on the filtered image. For example, the user may instruct the image to be filtered to be displayed in the filtered image based on a certain degree of transparency. At this time, as shown in FIG. 13, step 302 further includes the following sub-steps. In step 3023, a transparency proportion of the image to be filtered is acquired, wherein the transparency proportion indicates a transparency of the image to be filtered in a filtered image. Correspondingly, step 3022 includes: acquiring the retaining proportion of the pixel point in the image to be filtered based on the transparency proportion, the hue parameter and the range parameter.

Optionally, the transparency proportion, the hue parameter and the range parameter may be sent in the same or different filtering instructions, which will not be specifically limited in the embodiment of the present disclosure.

The value range of the transparency proportion th1 may be set to [0,1]. When the transparency proportion th1=0, the image to be filtered is completely opaque, i.e., the effect of displaying the image to be filtered in the filtered image is that only the image to be filtered is displayed. When the transparency proportion th1=1, the image to be filtered is completely transparent, i.e., the effect of displaying the image to be filtered in the filtered image is that only the image filtered based on the hue parameter and the range parameter is displayed. When the transparency proportion th1 is in other values, the filtering effect lies in between.

In addition, a reference may be made to the implementation of acquiring the hue parameter and the range parameter for implementation of acquiring the transparency proportion.

When step 302 further includes step 3023, the retaining proportion of the pixel point may be determined based on the transparency proportion. At this time, step 3023 is executed prior to step 3022, and step 3022 includes the following sub-steps.

In step 3022b1, a reference retaining proportion of the pixel point in the image to be filtered is acquired based on the hue parameter and the range parameter.

A reference may be made to the relevant descriptions in steps 3022a1 to 3022a2 for implementation of step 3022b1, which will not be repeated herein.

In step 3022b1, the retaining proportion of the pixel point in the image to be filtered is acquired based on the reference retaining proportion and the transparency proportion.

Optionally, step 3022b1 includes: acquiring an opacity proportion of the image to be filtered based on the transparency proportion, and determining a larger one of the reference retaining proportion and the opacity proportion of the pixel point as the retaining proportion of the pixel point, wherein the opacity proportion is used to indicate an opacity displayed by the image to be filtered in the filtered image. Optionally, the opacity degree proportion th2=1-transparency proportion th1.

Both the opacity degree proportion and the reference retaining proportion reflect the user's expectations for the color filtering effect in the image to be filtered. When the opacity degree proportion and the reference retaining proportion are different, they indicate the user's expectations for the different color filtering effects in the image to be filtered. In order to maintain the consistency of the color filtering effect, it is necessary to determine the retaining proportion based on the opacity degree proportion and the reference retaining proportion, so as to determine the consistent filtering effects. By determining the larger one of the reference retaining proportion and the opacity degree proportion of any pixel point as the retaining proportion of the pixel point, the retaining proportion may reflect the user's stronger desire for filtering, the filtering effect acquired by performing color filtering based on the retaining proportion is improved, such that a better user experience is acquired.

It should be noted that based on the reference retaining proportion and the transparency ratio proportion, the implementation of acquiring the retaining proportion of the pixel point in the image to be filtered is not limited to the implementation in the foregoing content, and may be adjusted according to application requirements. For example, the smaller one of the opacity degree proportion and the reference retaining proportion may also be determined as the retaining proportion, or a weighted value of the opacity degree proportion and the reference retaining proportion may be determined as the retaining proportion, which will not be specifically limited in the embodiments of the present disclosure.

In step 303, a filtered image is acquired by adjusting the saturation value of the pixel point in the image to be filtered based on the retaining proportion of the pixel point in the image to be filtered.

After the retaining proportion of the pixel point in the image to be filtered is acquired, the filtered image may be acquired by adjusting the saturation of the pixel point in the image to be filtered based on the retaining proportion. When the retaining proportion table is used to record the retaining proportion of each pixel point in the image to be filtered, in step 303, the retaining proportion of the corresponding pixel point may be acquired by looking up the retaining proportion table based on the hue value of each pixel point, and the retaining proportion is used to adjust the saturation value of the pixel point.

Optionally, since the saturation represents a ratio of the purity of the selected color and the maximum purity of the color, color filtering of the image to be filtered may be achieved by adjusting the saturation value. In some embodiments, step 303 includes: determining a product of the retaining proportion of any pixel point and the saturation value of the pixel point as the adjusted saturation value of the pixel point, and the hue value and the value of the pixel point remain unchanged.

It should be noted that in the process of performing step 303, step 303 may be performed on each of all the pixel points in the image to be filtered one by one, or, step 303 may be performed on part or all of the pixel points in the image to be filtered. The method for performing step 303 on all the pixel points in the image to be filtered will not be specifically limited in the embodiments of the present disclosure.

When the retaining proportion of the pixel point is determined based on the hue parameter and the range parameter, the retaining proportion of the pixel point with different hue values is high in middle and low on two sides, and the product of the retaining proportion of any pixel point and the saturation value of the pixel point is determined as the adjusted saturation value of the pixel point, so that the more similar the hue of the color is to the hue to be retained, the higher a saturation of the color of the pixel point is, and the more different the color is from the hue to be retained, the lower the saturation of the color of the pixel point is. That is, when the color is more similar to grey, the color filtering effect transitions naturally, the color is continuous, and the method is more suitable for an artistic style filter.

In step 304, the filtered image is converted into an image represented by an RGB color space.

The user needs to check the filtering effect after performing color filtering on the image. At this time, after adjusting the saturation value of the pixel point in the image to be filtered, the filtered image also needs to be displayed. In addition, in order to facilitate checking, the displayed image may be an image represented by an RGB color space. Therefore, since the filtered image is an image represented by the HSV color space, after adjusting the saturation value of the pixel point in the image to be filtered, the filtered image may also be converted into an image represented by the RGB color space. In some embodiments, the filtered image may be converted into the image represented by the RGB color space based on the relationship shown in Formula 1.

In step 305, a converted image represented by the RGB color space is acquired.

Figure 14:
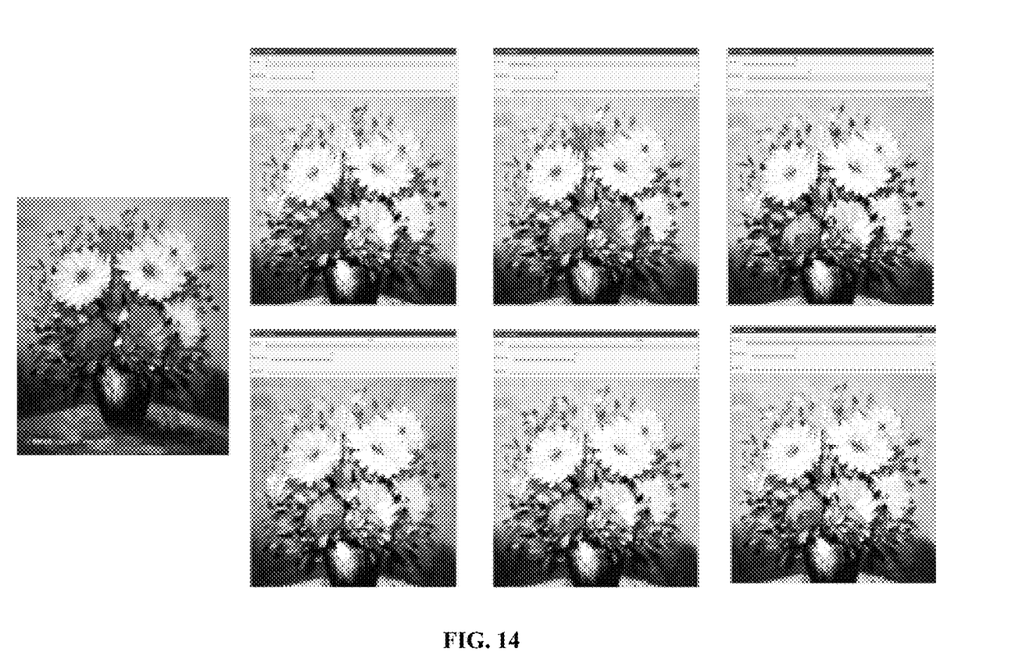
FIG. 14 is a schematic diagram of a filtering effect achieved by using the method for filtering the image colors, provided by an embodiment of the present disclosure, according to an embodiment of the present disclosure.

FIG. 14 is a schematic diagram showing a filtering effect achieved by using the method for filtering the image colors, provided by an embodiment of the present disclosure. As shown in FIG. 14, the leftmost picture shows the image (a vase with colorful flowers) indicated by the user to be filtered. The image is represented by the RGB color space. The six pictures on the right respectively show color filtering effects of the hue to be retained at different time, and the filtered image has been converted into the image represented by the RGB color space. In the top row from left to right, the color-filtered images acquired by retaining red, yellow and green are shown respectively, and in the bottom row from left to right, the color-filtered images acquired by retaining blue, purple and pinkish red are shown respectively. It can be seen that by adopting the method for filtering the image colors, provided by the embodiment of the present disclosure, a color-filtered image with a color filtering effect that transitions naturally may be acquired.

In summary, in the method for filtering the image colors, provided by the embodiment of the present disclosure, the retaining proportion of the pixel point in the image to be filtered is acquired, and the saturation value of the pixel point in the image to be filtered is adjusted based on the retaining proportion. Since the retaining proportion of any pixel point is positively correlated with the similarity between the hue of the pixel point and the hue to be retained of the pixel point, the more similar the color is to the hue to be retained in the filtered image, the higher a saturation of the color is, and the more different the color is from the hue to be retained, the lower the saturation of the color is. That is, when the color is more similar to grey, some colors may be accurately kept unchanged without damaging a visual effect, and at the same time, other colors are changed into grey, making a color filtering effect transition naturally and achieving a better filtering effect.

It should be noted that the method according to the present disclosure may be executed by a single device, such as a computer or a server. The method according to this embodiment is also applicable to a distributed scenario, in which the method is accomplished by the mutual coordination of a plurality of devices. In the case of such a distributed scenario, one of the plurality of devices may only execute one or more steps of the method according to the present specification; and the plurality of devices will interact with each other to accomplish the described method.

In addition, in the method for filtering the image colors according to the embodiments of the present disclosure, the sequence of the steps can be adjusted appropriately, and the steps can also be increased or decreased according to the situation. Various methods that are easily conceivable for any of those skilled in the art within a technical scope of the present disclosure should be covered by a scope of protection of the present disclosure, and thus will not repeat herein.

Figure 15:
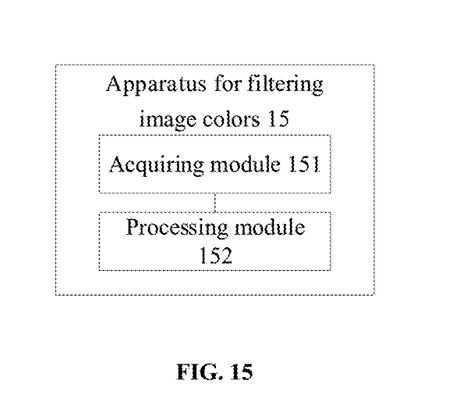
FIG. 15 is a schematic structural diagram of an apparatus for filtering image colors according to an embodiment of the present disclosure.

FIG. 15 is a schematic structural diagram of an apparatus for filtering image colors according to an embodiment of the present disclosure. As shown by FIG. 15, the apparatus 15 for filtering image colors includes:

an acquiring module 151 configured to acquire an image to be filtered, wherein a pixel point in the image to be filtered is represented by a hue value, a saturation value and a value, wherein the acquiring module 151 is further configured to acquire a retaining proportion of the pixel point in the image to be filtered, wherein a retaining proportion of any pixel point is used to indicate a degree of a saturation of the pixel point to be retained, and is positively correlated with a similarity between a hue of the pixel point and a hue to be retained of the pixel point; and a processing module 152 configured to acquire a filtered image by adjusting the saturation value of the pixel point in the image to be filtered based on the retaining proportion of the pixel point in the image to be filtered.

Optionally, the acquiring module 151 is further configured to:

acquire a filtering instruction transmitted for the image to be filtered, wherein the filtering instruction carries a hue parameter and a range parameter, the hue parameter indicates a hue to be retained of the image to be filtered, and the range parameter indicates a transition range from the hue to be retained to a hue to be filtered out; and acquire the retaining proportion of the pixel point in the image to be filtered based on the filtering instruction.

Optionally, the acquiring module 151 is further configured to:

acquire a mapping relationship between a hue, determined by the hue parameter and the range parameter, and the retaining proportion; and acquire the retaining proportion of the pixel point in the image to be filtered based on the mapping relationship and the hue value of the pixel point in the image to be filtered.

Optionally, a mapping relationship between the hue x, determined by the hue parameter H0 and the range parameter σ, and a reference retaining proportion f(x) satisfies the following equation:

$$f(x) = e^{-\frac{(x-H0)^2}{2\times\sigma^2}}.$$

Optionally, the acquiring module 151 is further configured to:

acquire a transparency proportion of the image to be filtered, wherein the transparency proportion indicates a transparency of the image to be filtered in a filtered image; and acquiring the retaining proportion of the pixel point in the image to be filtered based on the filtering instruction includes:

acquiring a reference retaining proportion of the pixel point in the image to be filtered based on the hue parameter and the range parameter; and acquiring the retaining proportion of the pixel point in the image to be filtered based on the reference retaining proportion and the transparency proportion.

Optionally, the acquiring module 151 is further configured to:

acquire an opacity proportion of the image to be filtered based on the transparency proportion, wherein the opacity proportion indicates an opacity displayed by the image to be filtered in the filtered image; and determine a larger one of a reference retaining proportion and an opacity proportion of the pixel point as the retaining proportion of the pixel point.

Optionally, the processing module 152 is further configured to determine a product of the retaining proportion of the pixel point and a saturation value of the pixel point as an adjusted saturation value of the pixel point.

Optionally, the acquiring module 151 is further configured to:

when an image needed to be filtered is represented by a color space other than an HSV color space, acquire the image to be filtered by converting the image needed to be filtered into an image represented by the HSV color space; and when the image needed to be filtered is represented by the HSV color space, determine the image needed to be filtered as the image to be filtered.

Figure 16:
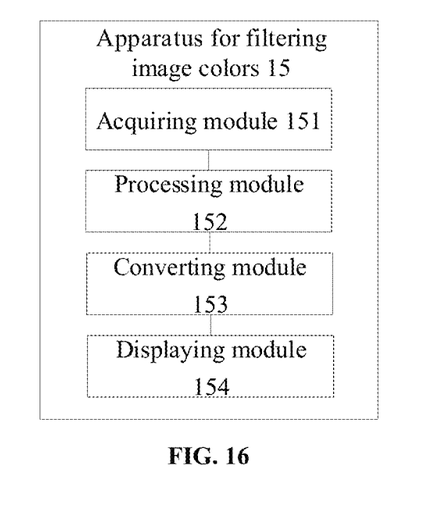
FIG. 16 is a schematic structural diagram of another apparatus for filtering image colors according to an embodiment of the present disclosure.

Optionally, as shown by FIG. 16, the apparatus 15 for filtering image colors further includes:

a converting module 153 configured to convert the filtered image into an image represented by a red-green-blue RGB color space; and a displaying module 154 configured to display a converted image represented by the RGB color space.

In summary, in the apparatus for filtering the image colors provided by the embodiment of the present disclosure, the retaining proportion of the pixel point in the image to be filtered is acquired by the acquiring module, and the saturation value of the pixel point in the image to be filtered is adjusted by the processing module based on the retaining proportion. Since the retaining proportion of any pixel point is positively correlated with the similarity between the hue of the pixel point and the hue to be retained of the pixel point, the more similar the color is to the hue to be retained in the filtered image, the higher a saturation of the color is, and the more different the color is from the hue to be retained, the lower the saturation of the color is. That is, when the color is more similar to grey, some colors may be accurately kept unchanged without damaging a visual effect, and at the same time, other colors are changed into grey, making a color filtering effect transition naturally and achieving a better filtering effect.

For the convenience of description, when describing the above apparatus, the functions are divided into various modules and described separately. Of course, when implementing the embodiments of the present disclosure, the functions of each module may be implemented in the same one or more software and/or hardware.

The apparatus of the foregoing embodiment is used to implement the corresponding method in the foregoing embodiment, and has the beneficial effects of the corresponding method embodiment, which will not be repeated herein.

Figure 17:
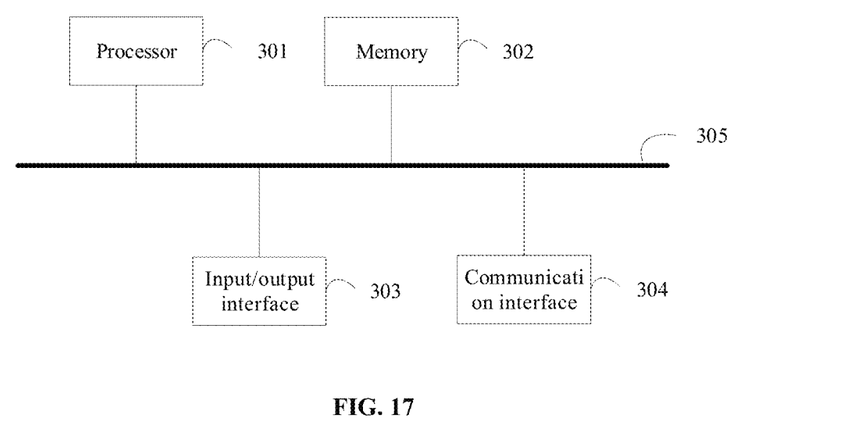
FIG. 17 is a schematic structural diagram of an electronic device according to an embodiment of the present disclosure.

FIG. 17 is a schematic structural hardware diagram of a more specific electronic device according to an embodiment of the present disclosure. The device may include: a processor 301, a memory 302, an input/output interface 303, a communication interface 304 and a bus 305. Communication connection among the processor 301, the memory 302, the input/output interface 303, the communication interface 304 inside the device is realized through the bus 305.

The processor 301 may be implemented by a general central processing unit (CPU), a micro-processor, an application-specific integrated circuit (ASIC), one or more integrated circuits or the like to execute related programs so as to realize the technical solutions provided by the embodiments of the present disclosure.

The memory 302 may be implemented in the form of a read only memory (ROM), a random access memory (RAM), a static storage device, a dynamic storage device, etc. The memory 302 may store an operating system and other applications. When the technical solutions provided by the embodiments of the present disclosure are implemented by software or firmware, relevant program codes are stored in the memory 302 and called and executed by the processor 301.

The input/output interface 303 is configured for connection with an input/output module to realize information input and output. The input/output/module may be configured in the device as a component (not shown in the figure), or may be externally connected to the device to provide corresponding functions. An input device may include a keyboard, a mouse, a touch screen, a microphone, various sensors, etc., and an output device may include a display, a speaker, a vibrator, an indicator light, etc.

The communication interface 304 is configured for connection with a communication module (not shown in the figure) to realize communication interaction between the device and other devices. The communication module may realize communication in a wired (such as a USB and a network cable) or wireless (such as a mobile network, WIFI and Bluetooth) fashion.

The bus 305 includes a path to transmit information between the various components of the device (such as the processor 301, the memory 302, the input/output interface 303 and the communication interface 304).

It should be noted that although the above device only shows the processor 301, the memory 302, the input/output interface 303, the communication interface 304, and the bus 305, in the specific implementation process, the device may further include other components necessary for normal operations. In addition, it can be understood by those skilled in the art that the above-mentioned device may only include components necessary for implementing the solutions provided by the embodiments of the present disclosure, and need not include all the components shown in the drawings.

A computer-readable medium provided by an embodiment of the present disclosure includes both persistent and non-persistent and removable and non-removable media that may be implemented in any method or technology for storage of information. The information may be computer-readable instructions, data structures, program modules or other data. Examples of the computer storage medium include, but are not limited to, a phase-change RAM (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, compact disk read-only memory (CD-ROM), a digital versatile disk (DVD) or other optical storage, magnetic cassettes, a magnetic tape, a magnetic disk storage or other magnetic storage devices, or any other non-transmission media that can be used to store information for access by a computing device.

The specific embodiments of the present disclosure are described above. Other embodiments shall fall within the scope of the appended claims. In some cases, the operations and steps recorded in the claims can be executed in an order different from that in the embodiments to achieve a desired result as well. In addition, the processes depicted in the accompanying drawings are not necessarily performed based on the illustrated specific order or continuous order to achieve the desired result. In some embodiments, multi-task processing and parallel processing are also possible or may be advantageous.

A person of ordinary skill in the art should understand that the discussion of any of the above embodiments is merely for an exemplary purpose, and is not intended to imply that the scope of the present disclosure (including the claims) is limited to these examples. Under the concept of the present disclosure, the above embodiments or the technical features in different embodiments may also be combined; and the steps may be accomplished in any order. Moreover, many other variations in different aspects of the present disclosure as described above are possible but not provided in the detail for the sake of brevity.

In addition, for the brevity of description and discussion and in order not to obscure the present disclosure, the well-known power/ground connections to the integrated circuit (IC) chips and other components may or may not be illustrated in the provided drawings. In addition, the devices may be illustrated in the form of block diagrams in order not to obscure the present disclosure, and the consideration is also given to the fact that the details about the embodiments of the devices in these block diagrams are highly dependent on the platform on which the present disclosure will be implemented (that is, these details should be fully within the understanding of those skilled in the art). In the case where the specific details (for example, the circuits) are set forth to describe the exemplary embodiments of the present disclosure, it is obvious to those skilled in the art that the present disclosure may be implemented without these specific details or with these specific details changed. Therefore, these descriptions should be considered illustrative rather than limiting.

Although the present disclosure has been described in combination with the specific embodiments of the present disclosure, many substitutions, modifications and variations of these embodiments will be apparent to those of ordinary skill in the art based on the foregoing description. For example, the discussed embodiments may be used in other memory architectures (for example, a dynamic RAM (DRAM)).

The present disclosure is intended to cover all such substitutions, modifications and variations that fall within the broad scope of the appended claims. Therefore, any omission, modification, equivalent substitution, improvement and the like made within the spirit and principle of the present disclosure shall be construed as being included in the protection scope of the present disclosure.

What is claimed is:

1. A method for filtering image colors, by which an image is processed by a computer to have an image hue corresponding to a target hue value, comprising:
  acquiring an image to be processed, wherein each of pixel points in the image to be processed is represented by a hue value, a saturation value and a value;
  acquiring a saturation retention ratio function for pixel points in the image to be processed, wherein the saturation retention ratio function for any of the pixel points has a value by which a saturation value of a corresponding pixel point is to be multiplied when the saturation value is adjusted, and the value of the saturation retention ratio function is negatively correlated with a difference between the target hue value and a hue value of the corresponding pixel point; and
  adjusting saturation values of the pixel points in the image to be processed based on the saturation retention ratio function, to obtain an image having the image hue corresponding to the target hue value.

2. The method according to claim 1, wherein acquiring the saturation retention ratio function for pixel points in the image to be processed comprises:
  acquiring a filtering instruction for the image to be processed, wherein the filtering instruction carries the target hue value and a range parameter, and the range parameter indicates a half-width of the saturation retention ratio function; and
  acquiring the saturation retention ratio function based on the filtering instruction.

3. The method according to claim 2, wherein the saturation retention ratio function is a Gauss function.

4. The method according to claim 3, wherein the saturation retention ratio function is:

$$f(x) = e^{-\frac{(x-H0)^2}{2 \times \sigma^2}}.$$

wherein x is the hue value of a corresponding pixel point, f(x) is the saturation retention ratio function, H0 is the target hue value, and σ is the range parameter.

5. The method according to claim 1, wherein adjusting the saturation values of the pixel points in the image to be processed based on the saturation retention ratio function, to obtain an image having the image hue corresponding to the target hue value, comprises:
  for each of the pixel points, determining a product of a saturation value of the pixel point and a larger one of a first value and a second value as an adjusted saturation value of the pixel point, wherein the first value is a value of the saturation retention ratio function for the pixel point, and the second value is a opacity value which is between 0 and 1.

6. The method according to claim 1, wherein acquiring the image to be processed comprises:
  when an image needed to be processed is represented by a color space other than an HSV color space, acquiring the image to be processed by converting the image needed to be processed into an image represented by the HSV color space; and
  when the image needed to be processed is represented by the HSV color space, determining the image needed to be processed as the image to be processed.

7. The method according to claim 1, wherein after adjusting the saturation values of the pixel points in the image to be processed based on the saturation retention ratio function, to obtain an image having the image hue corresponding to the target hue value, the method further comprises:
  converting the image having the image hue corresponding to the target hue value into an image represented by an RGB color space; and
  displaying the image represented by the RGB color space.

8. An electronic device, comprising a memory, a processor and a computer program stored in the memory and executable on the processor, wherein when the program is executed by the processor, the following steps are performed:
  acquiring an image to be processed, wherein each of pixel points in the image to be processed is represented by a hue value, a saturation value and a value;
  acquiring a saturation retention ratio function for pixel points in the image to be processed, wherein the saturation retention ratio function for any of the pixel points has a value by which a saturation value of a corresponding pixel point is to be multiplied when the saturation value is adjusted, and the value of the saturation retention ratio function is negatively correlated with a difference between a target hue value and a hue value of the corresponding pixel point; and
  adjusting saturation values of the pixel points in the image to be processed based on the saturation retention ratio function, to obtain an image having the image hue corresponding to the target hue value.

9. The electronic device according to claim 8, wherein when the program is executed by the processor, the following steps are performed:
  acquiring a filtering instruction for the image to be processed, wherein the filtering instruction carries the target hue value and a range parameter, and the range parameter indicates a half-width of the saturation retention ratio function; and
  acquiring the saturation retention ratio function based on the filtering instruction.

10. The electronic device according to claim 9, wherein the saturation retention ratio function is a Gauss function.

11. The electronic device according to claim 10, wherein the saturation retention ratio function is:

$$f(x) = e^{-\frac{(x-H_0)^2}{2 \times \sigma^2}}.$$

wherein x is the hue value of a corresponding pixel point, f(x) is the saturation retention ratio function, H0 is the target hue value, and σ is the range parameter.

12. The electronic device according to claim 8, wherein when the program is executed by the processor, the following step is performed:
for each of the pixel points, determining a product of a saturation value of the pixel point and a larger one of a first value and a second value as an adjusted saturation value of the pixel point, wherein the first value is a value of the saturation retention ratio function for the pixel point, and the second value is a opacity value which is between 0 and 1.

13. The electronic device according to claim 8, wherein when the program is executed by the processor, the following steps are performed:
when an image needed to be processed is represented by a color space other than an HSV color space, acquiring the image to be processed by converting the image needed to be processed into an image represented by the HSV color space; and
when the image needed to be processed is represented by the HSV color space, determining the image needed to be processed as the image to be processed.

14. The electronic device according to claim 8, wherein when the program is executed by the processor, the following steps are performed:
converting the image having the image hue corresponding to the target hue value into an image represented by an RGB color space; and
displaying the image represented by the RGB color space.

15. A non-transitory computer-readable storage medium storing computer instructions therein, wherein the computer instructions are configured to enable a computer to perform the following steps:
acquiring an image to be processed, wherein each of pixel points in the image to be processed is represented by a hue value, a saturation value and a value;
acquiring a saturation retention ratio function for pixel points in the image to be processed, wherein the saturation retention ratio function for any of the pixel points has a value by which a saturation value of a corresponding pixel point is to be multiplied when the saturation value is adjusted, and the value of the saturation retention ratio function is negatively correlated with a difference between a target hue value and a hue value of the corresponding pixel point; and
adjusting saturation values of the pixel points in the image to be processed based on the saturation retention ratio function, to obtain an image having the image hue corresponding to the target hue value.

16. The storage medium according to claim 15, wherein adjusting saturation values of the pixel points in the image to be processed based on the saturation retention ratio function, to obtain an image having the image hue corresponding to the target hue value, comprises:
for each of the pixel points, determining a product of a saturation value of the pixel point and a larger one of a first value and a second value as an adjusted saturation value of the pixel point, wherein the first value is a value of the saturation retention ratio function for the pixel point, and the second value is a opacity value which is between 0 and 1.

17. The storage medium according to claim 15, wherein acquiring the saturation retention ratio function for pixel points in the image to be processed comprises:
acquiring a filtering instruction for the image to be processed, wherein the filtering instruction carries the target hue value and a range parameter, and the range parameter indicates a half-width of the saturation retention ratio function; and
acquiring the saturation retention ratio function based on the filtering instruction.

18. The storage medium according to claim 17, wherein the saturation retention ratio function is a Gauss function.

19. The storage medium according to claim 18, wherein the saturation retention ratio function is:

$$f(x) = e^{-\frac{(x-H_0)^2}{2 \times \sigma^2}},$$

wherein x is the hue value of a corresponding pixel point, f(x) is the saturation retention ratio function, H0 is the target hue value, and σ is the range parameter.

20. The storage medium according to claim 15, wherein acquiring the image to be processed comprises:
when an image needed to be processed is represented by a color space other than an HSV color space, acquiring the image to be processed by converting the image needed to be processed into an image represented by the HSV color space; and
when the image needed to be processed is represented by the HSV color space, determining the image needed to be processed as the image to be processed.

* * * * *